United States Patent [19]
Watanabe

[11] Patent Number: 5,774,272
[45] Date of Patent: Jun. 30, 1998

[54] LOW-MAGNIFICATION APOCHROMATIC MICROSCOPE OBJECTIVE LENS

[75] Inventor: Katsuya Watanabe, Yokohama, Japan

[73] Assignee: Nikon Corporation, Tokyo, Japan

[21] Appl. No.: 730,070

[22] Filed: Oct. 15, 1996

[30] Foreign Application Priority Data

Nov. 14, 1995 [JP] Japan ................................. 7-321159

[51] Int. Cl.$^6$ ............................. G02B 3/00; G02B 9/36
[52] U.S. Cl. ...................... 359/660; 359/656; 359/775; 359/776; 359/777; 359/778
[58] Field of Search ................................. 359/656–661, 359/775–778

[56] References Cited

U.S. PATENT DOCUMENTS 4,501,474  2/1985  Kimura .................................. 359/659

*Primary Examiner*—David C. Nelms
*Assistant Examiner*—Evelyn A. Lester
*Attorney, Agent, or Firm*—Klarquist Sparkman Campbell Leigh & Whinston, LLP

[57] ABSTRACT

Low-power objective lenses for a microscope are disclosed. The objective lenses exhibit apochromatic optical performance at a numerical aperture of at least 0.1 and have a magnification of about 2× or less. Each such objective lens comprises, in order from the object side, a first lens group having positive refractive power; a second lens group having negative refractive power and comprising a negative meniscus lens with a concave surface oriented toward the image side; a third lens group having negative refractive power and having at least one cemented surface; and a fourth lens group having positive refractive power and comprising a positive meniscus lens element with a convex surface oriented toward the image side, and a positive cemented lens including a negative lens element cemented to a positive lens element. The objective lenses satisfy the condition: $1.2 < f_I / D_1 < 2.3$ and other conditions, wherein $f_I$ is focal length of the first lens group and $D_1$ is the axial distance from a lens surface in the first lens group closest to the image side to a lens surface in the second lens group closest to the object side.

14 Claims, 7 Drawing Sheets

LOW-MAGNIFICATION APOCHROMATIC MICROSCOPE OBJECTIVE LENS

FIELD OF THE INVENTION

This invention pertains to low-magnification apochromatic objective lenses for microscopes.

BACKGROUND OF THE INVENTION

In the past, inventive activity directed toward extremely low-power microscope objective lenses having a magnification of about 2× or less has been scanty compared to such activity directed toward microscope objective lenses having a mid-range to high magnification. Low-power objective lenses as disclosed in Japan Kôkoku Patent Document No. SHO 57-52568 and Japan Kôkai Patent Document No. SHO 58-192012 are among the very few that are known in the prior art, and are exemplary of contemporary designs of such lenses.

The microscope objective lens disclosed in Japan Kôkoku Patent Document No. SHO 57-52568 is a relatively "bright" lens having a numerical aperture (N.A.) of 0.08 at 2× magnification; but, this lens does not achieve satisfactory imaging performance, at the periphery of its field of view, for an image height of greater than 9 mm. According to contemporary standards reflecting the need for optical microscopes that can permit observations of ultra-wide visual fields, the lens disclosed in the '568 Document is inadequate for modern users' needs.

The microscope objective lens disclosed in Japan Kôkai Patent Document No. SHO 58-192012 provides satisfactory imaging performance, at the periphery of its field of view, for an image height of 13 mm. However, the numerical aperture of this lens at 2.5×magnification is fairly small at 0.07, which is insufficient for satisfactory resolution.

Thus, it has heretofore been extremely difficult with a very low-magnification objective lens for a microscope to provide both image flatness across a wide field of view and a large numerical aperture. Furthermore, satisfying these criteria in an objective lens that is also apochromatic has also been elusive.

SUMMARY OF THE INVENTION

The present invention rectifies the foregoing shortcomings of the prior art and provides apochromatic low-magnification microscope objective lenses that exhibit excellent imaging performance from the center to the perimeter of the image, and have an extremely large aperture.

According to a preferred embodiment, an objective lens according to the present invention has a focal length f and comprises, in order from the object side to the image side, the following lens groups: (a) a first lens group having a positive refractive power and a focal length $f_1$; (b) a second lens group having a negative refractive power and a focal length $f_2$, and comprising a negative meniscus lens with a concave surface oriented toward the image side; (c) a third lens group having a negative refractive power and comprising at least one cemented surface; and (d) a fourth lens group having a positive refractive power and comprising a positive meniscus lens element having a convex surface oriented toward the image side, and a positive cemented lens including a negative lens element having a focal length $f_{4n}$, cemented to a positive lens element having a focal length $f_{4p}$. Furthermore, such an objective lens satisfies at least the first (and preferably all) the following Conditional Expressions:

$1.2 < f_1/D_1 < 2.3$ ;

$0.4 < |r_{2i}/f_2| < 0.6$ ;

$0.2 < |r_i/f| < 0.3$ ;

$1.2 < |f_{4n}/f_{4p}| < 2.6$ ;

and $\theta_{4p} - \theta_{4n} < 0.005$ .

In the foregoing Conditional Expressions, $D_1$ is the axial distance from a lens surface in the first lens group closest to the image side to a lens surface in the second lens group closest to the object side; $r_{2i}$ is the curvature radius of a lens surface in the second lens group closest to the image side; $r_i$ is the curvature radius of a lens surface of the objective lens overall that is closest to the image side; $\theta_{4n}$ is the partial dispersion ratio of the negative lens element in the cemented lens in the fourth lens group; and $\theta_{4p}$ is the partial dispersion ratio of the positive lens element in the cemented lens in the fourth lens group, wherein $\theta = (n_D - n_C)/(n_F - n_C)$, and $n_D$, $n_F$, and $n_C$ are D-line, F-line, and G-line refractive indices, respectively.

DETAILED DESCRIPTION

Figure 1:
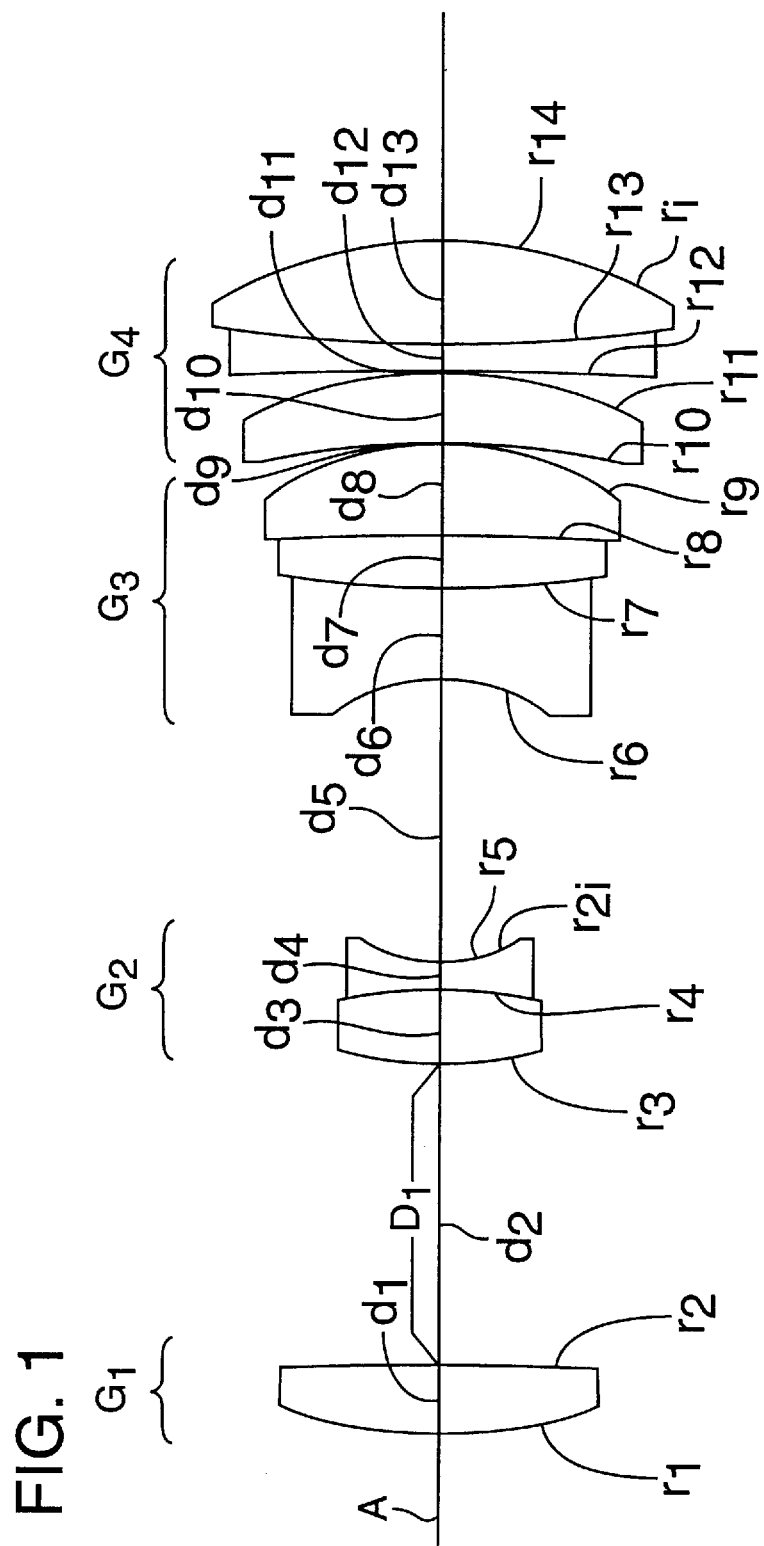
FIG. 1 is an optical diagram showing certain general features of objective lenses according to the present invention as well as specific features of Example Embodiment 1.
Figure 3:
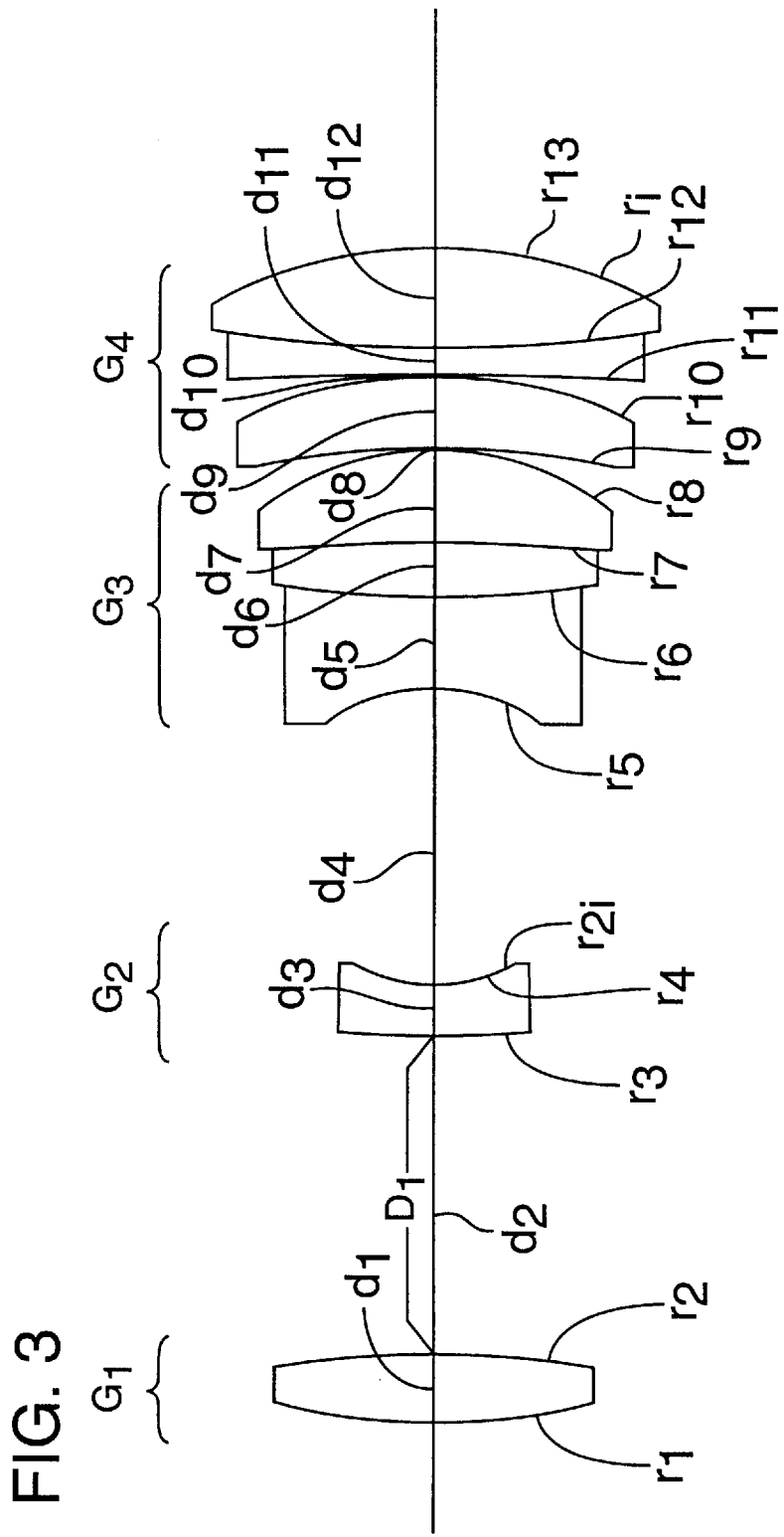
FIG. 3 is an optical diagram showing specific features of Example Embodiment 2.
Figure 5:
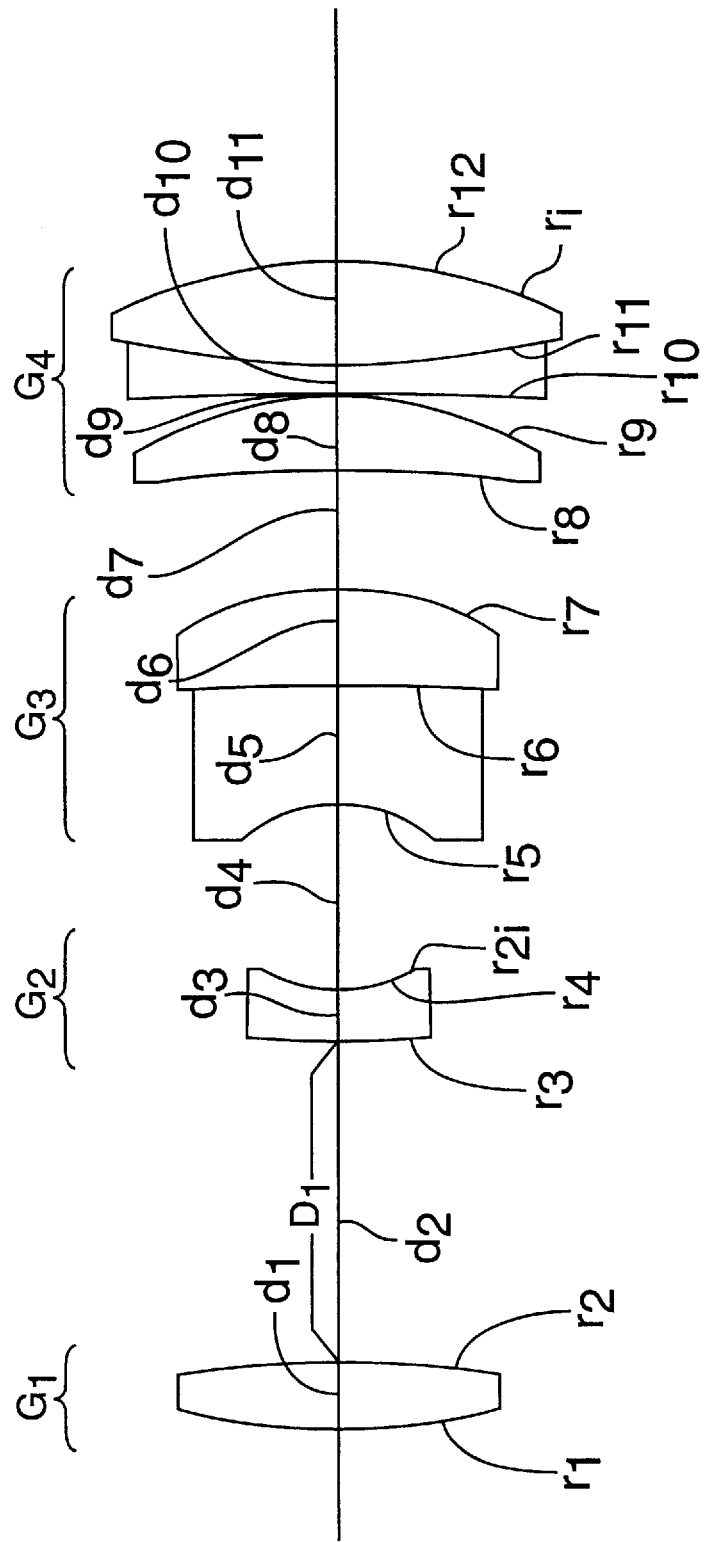
FIG. 5 is an optical diagram showing specific features of Example Embodiment 3.

As used herein, the "object side" of the lens is the axial side on which is situated the object to be viewed using the lens. The "image side" of the lens is the axial side opposite the "object side" and is the axial side on which would be situated an image formed by the lens. In FIGS. 1, 3, and 5, the object side is on the left and the image side is on the right.

FIG. 1 shows general aspects of a microscope objective lens according to the present invention. The lens of FIG. 1 comprises, in order from the object side and situated on an optical axis A, a first lens group $G_1$ having a positive refractive power; a second lens group $G_2$ having a negative refractive power and including a negative meniscus lens with a concave surface oriented toward the image side; a third lens group $G_3$ having a negative overall refractive power and including at least one cemented surface; and a fourth lens group $G_4$ having a positive refractive power and comprising a positive cemented lens including a negative lens element cemented to a positive lens element. The fourth lens group $G_4$ also comprises a positive meniscus lens element having a convex surface oriented toward the image side. The objective lens also satisfies at least the first (and preferably all) the following Conditional Expressions:

$$1.2 < f_1/D_1 < 2.3 \tag{1}$$

$$0.4 < |r_{2i}/f_2| < 0.6 \tag{2}$$

$$0.2 < |r_i/f| < 0.3 \tag{3}$$

$$1.2 < |f_{4n}/f_{4p}| < 2.6 \tag{4}$$

$$\theta^{4p} - \theta_{4n} < 0.005 \tag{5}$$

The variables in the foregoing Conditional Expressions are as follows: f1 is the focal length of the first lens group $G_1$; $D_1$ is the axial distance from the surface, in the first lens group $G_1$, closest to the image side to the surface, in the second lens group $G_2$, closest to the object side; $r_{2i}$ is the curvature radius of the surface, in the second lens group $G_2$, closest to the image side; $f_2$ is the focal length of the second lens group $G_2$; $r_i$, is the curvature radius of the surface, of all surfaces in the entire objective lens, that is closest to the image side; f is the overall focal length of the objective lens; $f_{4n}$ is the focal length of the negative lens element that is cemented to the positive lens element in the fourth lens group $G_4$; $f_{4p}$ is the focal length of the positive lens element that is cemented to the negative lens element in the fourth lens group $G_4$; $\theta_{4n}$ is the partial dispersion ratio of the negative lens element cemented to the positive lens element in the fourth lens group $G_4$; $\theta_{4p}$ is the partial dispersion ratio of the positive lens element cemented to the negative lens element in the fourth lens group $G_4$, wherein $$\theta = (n_D - n_C)/(n_F - n_C) \quad ;$$

and $n_D$, $n_F$, $n_c$ are refractive indexes for D-line, F-line, and C-line light, respectively.

Generally, in microscopes in which magnification is changed by rotating a turret fitted with several objective lenses, the distance from the surface of the object to the turret-mounting surface of the objective lenses is set so that re-focusing adjustments are unnecessary when switching from one objective lens on the turret to another. That is, to provide the microscope with a parfocal property, the focal lengths of the various objective lenses on the turret are equal despite the different magnifications of the objective lenses. Satisfying the parfocal requirement places a restriction on the range of allowable distance from the surface of the object to the surface of the objective lens that is closest to the object (i.e., the object-lens distance requirement). With low-magnification objective lenses, the object-lens distance requirement can be an important design obstacle because the focal length of such objective lenses must be long.

In order to overcome the object-lens distance restriction in objective lenses according to the present invention, a negative lens group with a large refractive power (group $G_2$ in FIG. 1) and a positive lens group (group $G_1$ in FIG. 1), separated a distance from the negative lens group, are arranged in the objective lens. Such an arrangement provides one type of a so-called retrofocus lens configuration in which the position of the principal point is shifted toward the image side. Meanwhile, the object side is made telecentric (i.e., the entrance pupil is at infinity) in order to direct a parallel illumination light flux to the image plane of the lens without vignetting. To achieve this end, the positive lens group $G_1$ is placed on the object side of the negative lens group $G_2$.

Conditional Expression (1) pertains to placing the first lens group $G_1$ at a certain axial distance from the second lens group $G_2$. Exceeding the maximum value of Conditional Expression (1) would cause telecentricity to be destroyed on the object side, resulting in an insufficient quantity of light being directed to the periphery of the field of view of the lens. If one were to attempt to correct this telecentricity problem by weakening the negative refractive power of the second lens group $G_2$, the overall length of the lens would increase, making it impossible to satisfy the object-lens distance restriction. If the value of $f_1/D_1$ were to fall below the minimum value in Conditional Expression (1), an undesirably decreased quantity of light would result at the periphery of the field of view. Furthermore, image-plane distortion would become excessive due to the concomitant increase in the refractive power of the first lens group $G_1$ (having an incident principal ray that is more displaced from the axis than the second lens group $G_2$). This would make it difficult to accomplish satisfactory correction in the other lens groups.

Satisfying Conditional Expression (1) provides a basic arrangement by which illumination light from the object can be directed to the image plane of the objective lens without vignetting. However, adhering only to Conditional Expression (1) without considering other aspects of the lens design could yield a lens configuration in which the path of each ray through the lens is asymmetrical with respect to the lens; this could present substantial problems with respect to correcting the various aberrations that will be created as a result. Since the second lens group $G_2$ has a strong negative refractive power, rays passing through this lens group below the principal ray are greatly bent, which can easily create asymmetrical coma aberrations. To avoid this problem, the second lens group $G_2$ is configured as a meniscus lens having a concave surface oriented toward the image side. Such a configuration greatly suppresses the generation of asymmetrical coma.

The curvature radius of the concave surface of the second lens group $G_2$ is established by Conditional Expression (2). Falling below the minimum value in Conditional Expression (2) would cause the downward coma aberration of the objective lens to become negative. This effect would be especially marked at the maximum field angle, which would be impossible to correct. Since the second lens group $G_2$ primarily affects off-axis rays, it would appear that spherical aberration is over-corrected. But, any such effect is balanced by the fact that spherical aberration also arises from the convex surface of the third lens group $G_3$. Exceeding the maximum value of Conditional Expression (2) would provide an insufficient correction of spherical aberration and an undesirable increase in Petzval's sum.

Conditional Expression (3) is primarily concerned with correcting spherical aberration. Exceeding the upper limit of this Conditional Expression would result in an excessive amount of spherical aberration. If one sought to correct this aberration by changing other lens groups, the curvature of certain lens elements in such groups would increase, thereby making it difficult to attain a large aperture.

Conditional Expressions (4) and (5) relate to the refractive power distribution and glass types in the cemented lens in the fourth lens group $G_4$, respectively. Exceeding the maximum value of Conditional Expression (4) would cause chromatic aberration of short-wavelength colors to increase in the positive direction. Conversely, falling below the minimum value of Conditional Expression (4) would cause chromatic coma aberration to worsen for rays passing above the principal ray.

Conditional Expression (5) specifically pertains to the secondary spectrum of axial chromatic aberration. Falling outside the limits of Conditional Expression (5) would make it too difficult for the lens to exhibit apochromatic performance.

Therefore, satisfying at least the first of the foregoing Conditional Expressions provides a low-magnification apochromatic microscope objective lens having a suitably large aperture.

EXAMPLE EMBODIMENTS

FIG. 1, FIG. 3, and FIG. 5 are optical diagrams showing the configurations of Example Embodiments 1, 2, and 3, respectively. Each Example Embodiment comprises, in order from the object side, a first lens group $G_1$ having a positive refractive power; a second lens group $G_2$ having a negative refractive power and including a negative meniscus lens with a concave surface oriented toward the image side; a third lens group $G_3$ having a negative refractive power and including at least one cemented surface; and a fourth lens group $G_4$ having a positive refractive power and comprising a positive meniscus lens element having a convex surface oriented toward the image side and a cemented lens including a negative lens element and a positive lens element.

In Example Embodiment 2, the cemented lens in the second lens group $G_2$ in Example Embodiment 1 is replaced with a single lens element (specifically, a negative meniscus lens element with the concave surface oriented toward the image side).

Example Embodiment 3 represents a lower cost embodiment wherein the three-element compound lens in the third lens group $G_3$ of Example Embodiment 2 is replaced with a two-element compound lens.

The various numerical specifications for Example Embodiments 1, 2, and 3 are listed in the following Tables 1, 2, and 3, respectively. The "Overall Specifications" portion of each Table provides data concerning the subject objective lens overall, wherein f denotes the focal length; N.A. denotes the numerical aperture; $\beta$ denotes the magnification; and W.D. represents the working distance (i.e., axial distance from the objective lens to the object). The "Lens Specifications" portion of each Table provides data on individual lens elements of the objective lens, wherein the first column labeled "No." sets forth lens surface numbers, beginning on the object side; the second column labeled "r" sets forth the corresponding curvature radius of each lens surface; the third column labeled "d" sets forth the axial distance between corresponding adjacent lens surfaces; the fourth column labeled "$n_D$" sets forth the refractive index (D-line; $\lambda$=587.6 nm) of the corresponding lens element; the fifth column labeled "$\nu_D$" sets forth the Abbe number (D-line; $\lambda$=587.6 nm) of the corresponding lens element; and the sixth column lists corresponding lens group numbers.

Table 4 sets forth values of the five Conditional Expressions for each of the three Example Embodiments.

TABLE 1

Overall Specifications
f = 100 mm    N.A. = 0.1
$\beta$ = −2.0    W.D. = 9.0 mm

| No. | r (mm) | d (mm) | $n_D$ | $\nu_D$ | Lens Group |
|---|---|---|---|---|---|
| 1 | 21.504 | 3.2 | 1.67025 | 57.53 | $G_1$ |
| 2 | −225.481 | 14.0 ($D_1$) | | | |
| 3 | 18.208 | 3.5 | 1.59951 | 35.51 | $G_2$ |
| 4 | −21.800 | 1.3 | 1.74443 | 49.52 | $G_2$ |
| 5 | 8.236 ($r_{2i}$) | 13.0 | | | |
| 6 | −8.870 | 4.3 | 1.67163 | 38.80 | $G_3$ |
| 7 | 46.357 | 2.5 | 1.69911 | 27.83 | $G_3$ |
| 8 | −187.326 | 4.2 | 1.49782 | 82.52 | $G_3$ |
| 9 | −15.356 | 0.1 | | | |
| 10 | −45.031 | 3.2 | 1.49782 | 82.52 | $G_4$ |
| 11 | −22.894 | 0.1 | | | |
| 12 | −248.185 | 1.3 | 1.69680 | 55.60 | $G_4$ |
| 13 | 68.121 | 4.8 | 1.49782 | 82.52 | $G_4$ |
| 14 | −23.164 ($r_i$) | | | | |

TABLE 2

Overall Specifications
f = 100 mm    N.A. = 0.1
$\beta$ = −2.0    W.D. = 9.0 mm

| No. | r (mm) | d (mm) | $n_D$ | $\nu_D$ | Lens Group |
|---|---|---|---|---|---|
| 1 | 29.597 | 3.2 | 1.72342 | 37.90 | $G_1$ |
| 2 | −55.982 | 15.0 ($D_1$) | | | |
| 3 | 58.239 | 2.3 | 1.64006 | 60.04 | $G_2$ |
| 4 | 8.787 ($r_{2i}$) | 14.0 | | | |
| 5 | −9.101 | 4.3 | 1.67163 | 38.80 | $G_3$ |
| 6 | 66.431 | 2.5 | 1.69911 | 27.83 | $G_3$ |
| 7 | −101.360 | 4.2 | 1.49782 | 82.52 | $G_3$ |
| 8 | −15.019 | 0.1 | | | |
| 9 | −52.921 | 3.3 | 1.49782 | 82.52 | $G_4$ |
| 10 | −25.292 | 0.1 | | | |
| 11 | −228.517 | 1.2 | 1.69680 | 55.60 | $G_4$ |
| 12 | 72.103 | 4.8 | 1.49782 | 82.52 | $G_4$ |
| 13 | −24.730 ($r_i$) | | | | |

TABLE 3

Overall Specifications
f = 100 mm    N.A. = 0.1
$\beta$ = −2.0    W.D. = 8.88 mm

| No. | r (mm) | d (mm) | $n_D$ | $\nu_D$ | Lens Group |
|---|---|---|---|---|---|
| 1 | 29.548 | 3.2 | 1.72342 | 37.90 | $G_1$ |
| 2 | −47.216 | 14.8 ($D_1$) | | | |
| 3 | 71.787 | 2.5 | 1.64006 | 60.04 | $G_2$ |
| 4 | 7.229 ($r_{2i}$) | 8.5 | | | |
| 5 | −8.158 | 5.5 | 1.55200 | 49.71 | $G_3$ |
| 6 | ∞ | 4.5 | 1.49782 | 82.52 | $G_3$ |
| 7 | −16.113 | 5.5 | | | |
| 8 | −112.380 | 3.5 | 1.49782 | 82.52 | $G_4$ |
| 9 | −20.254 | 0.1 | | | |
| 10 | −308.980 | 1.3 | 1.71300 | 53.93 | $G_4$ |
| 11 | 41.591 | 5.0 | 1.43385 | 95.25 | $G_4$ |
| 12 | −26.602 ($r_i$) | | | | |

TABLE 4

| Conditional Expression | | Example Embodiments | | |
|---|---|---|---|---|
| | | 1 | 2 | 3 |
| (1) | $f_1/D_1$ | 2.10 | 1.81 | 1.73 |
| (2) | $|r_{2i}/f_2|$ | 0.46 | 0.53 | 0.57 |
| (3) | $|r_i/f|$ | 0.23 | 0.25 | 0.26 |
| (4) | $|f_{4n}/f_{4p}|$ | 2.17 | 2.09 | 1.34 |
| (5) | $\theta_{4p} - \theta_{4n}$ | 0.00036 | 0.00036 | 0.00097 |

Figure 2:
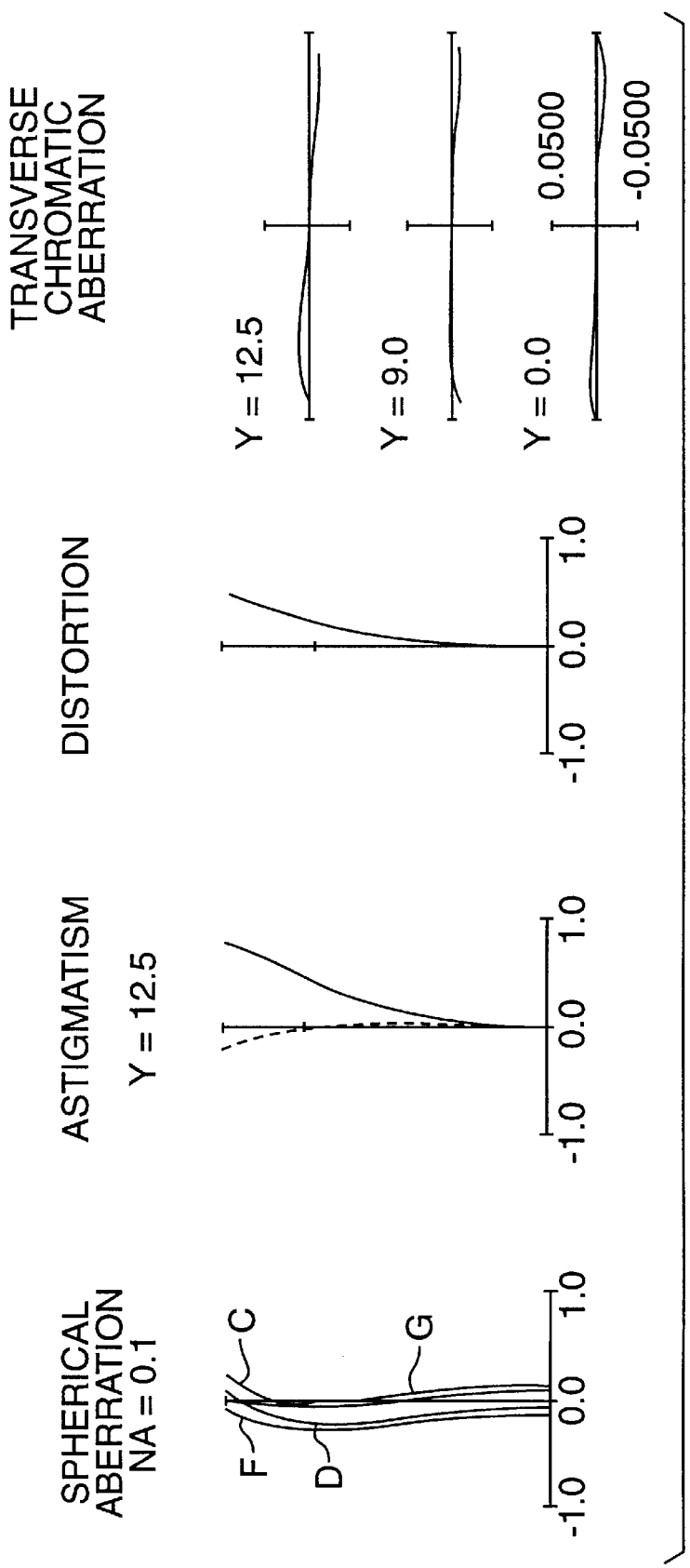
FIG. 2 provides plots of spherical aberration, astigmatism, distortion, and transverse chromatic aberration for Example Embodiment 1.
Figure 4:
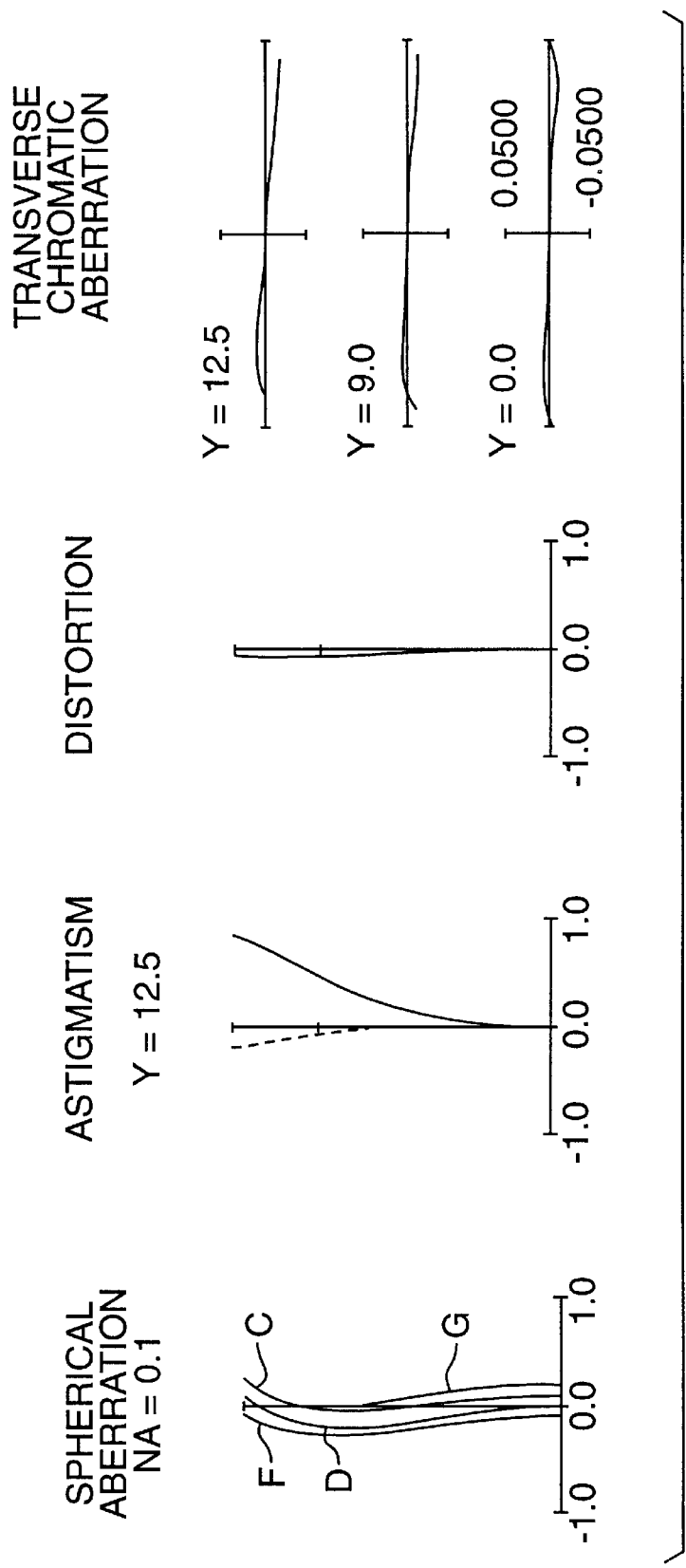
FIG. 4 provides plots of spherical aberration, astigmatism, distortion, and transverse chromatic aberration for Example Embodiment 2.
Figure 6:
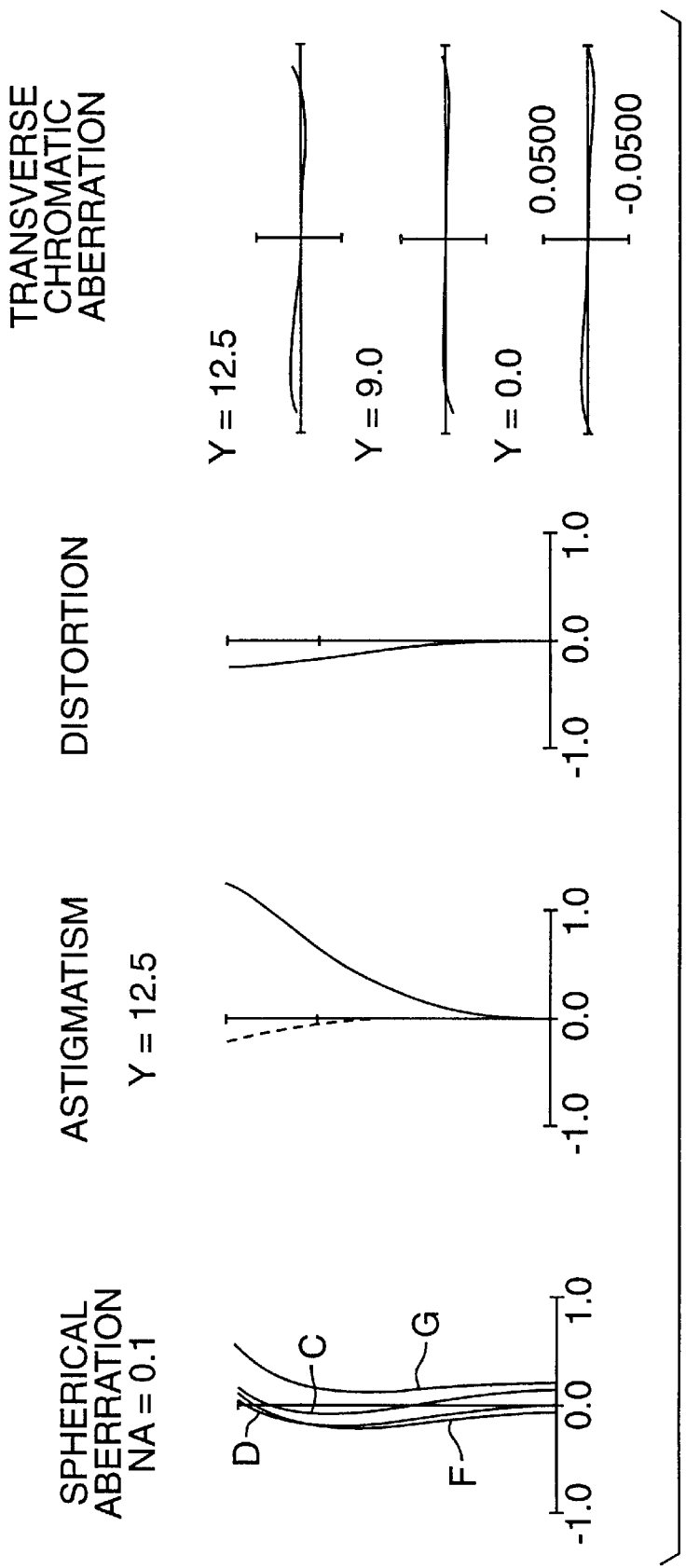
FIG. 6 provides plots of spherical aberration, astigmatism, distortion, and transverse chromatic aberration for Example Embodiment 3.

FIGS. 2, 4, and 6 provide plots of spherical aberration astigmatism, distortion, and transverse chromatic aberration for Example Embodiments 1, 2, and 3, respectively. In FIGS. 2, 4, and 6, D denotes the D-line ($\lambda$=587.6 nm), C denotes the C-line ($\lambda$=656.3 nm), F denotes the F-line ($\lambda$=486.1 nm), and G denotes the G-line ($\lambda$=435.8 nm). In the astigmatism plots, the solid line represents the sagittal image plane and the dashed line represents the meridional image plane.

From FIGS. 2, 4, and 6, it can be seen that each of the Example Embodiments has excellent imaging properties. From FIG. 4, pertaining to Example Embodiment 2, it can also be seen that aberrations are effectively corrected in the subject objective lens even though the second lens group $G_2$ consists of a single lens element. Similarly, it can be seen from FIG. 6, pertaining to Example Embodiment 3, that the subject objective lens still exhibits satisfactory optical performance even though the third lens group $G_3$ consists of a two-element compound lens rather than a three element compound lens.

Figure 7:
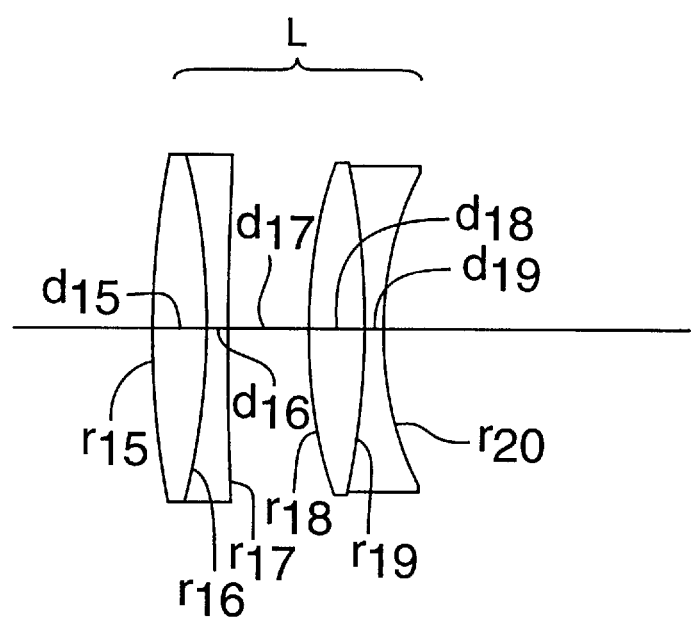
FIG. 7 is an optical diagram of a representative imaging lens intended for use with an objective lens according to the present invention; this imaging lens was used together with the objective lenses of Example Embodiments 1, 2, and 3 to obtain the aberration plots as shown in FIGS. 2, 4, and 6, respectively.

The microscope objective lenses of Example Embodiments 1–3 focus at infinity; hence, an image cannot be formed using the objective lens alone. I.e., microscope objective lenses are intended for use with a separate additional lens such as an eyepiece lens in order to form an image (wherein the additional lens is generally termed an "imaging lens"). Thus, objective lenses according to the present invention are configured with the understanding that each such lens is intended to be used with an imaging lens. Preferably, a suitable imaging lens satisfies the specifications depicted in FIG. 7 and set forth in Table 5, below. The aberration plots shown in FIGS. 2, 4, and 6 were obtained with the subject Example Embodiment used in conjunction with the imaging lens L of FIG. 7 and Table 5.

TABLE 5

| No. | r (mm) | d (mm) | $n_D$ | $v_D$ |
|---|---|---|---|---|
| 15 | 75.043 | 5.1 | 1.62280 | 57.03 |
| 16 | −75.043 | 2.0 | 1.74950 | 35.19 |
| 17 | 1600.580 | 7.5 | | |
| 18 | 50.256 | 5.1 | 1.66755 | 41.96 |
| 19 | −84.541 | 1.8 | 1.61266 | 44.40 |
| 20 | 36.911 | | | |

Therefore, low-magnification microscope objective lenses according to the present invention exhibit excellent apochromatic performance and imaging properties out to the periphery of the field of view, while having a large numerical aperture of at least 0.1.

Whereas the present invention has been described in connection with several Example Embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A low-magnification objective lens for a microscope, the objective lens comprising, in order from the object side to the image side:

(a) a first lens group having a positive refractive power and a focal length $f_1$;

(b) a second lens group having a negative refractive power and a focal length $f_2$, and comprising a negative meniscus lens with a concave surface oriented toward the image side;

(c) a third lens group having a negative refractive power and comprising at least one cemented surface;

(d) a fourth lens group having a positive refractive power and comprising a positive meniscus lens element having a convex surface oriented toward the image side, and a positive cemented lens including a negative lens element having a focal length $f_{4n}$, cemented to a positive lens element having a focal length $f_{4p}$; and (e) the objective lens having an overall focal length f and satisfying the following conditions:

$$1.2 < f_1/D_1 < 2.3$$

$$0.4 < |r_{2i}/f_2| < 0.6$$

$$0.2 < |r_i/f| < 0.3$$

$$1.2 < |f_{4n}/f_{4p}| < 2.6$$

$$\theta_{4p} - \theta_{4n} < 0.005$$

wherein $D_1$ is the axial distance from a lens surface in the first lens group closest to the image side to a lens surface in the second lens group closest to the object side; $r_{2i}$ is the curvature radius of a lens surface in the second lens group closest to the image side; $r_i$ is the curvature radius of a lens surface of the objective lens overall that is closest to the image side; $\theta_{4n}$ is the partial dispersion ratio of the negative lens element in the cemented lens in the fourth lens group; and $\theta_{4p}$ is the partial dispersion ratio of the positive lens element in the cemented lens in the fourth lens group, wherein $\theta = (n_D - n_C)/(n_F - n_C)$, and $n_D$, $n_F$, and $n_C$ are D-line, F-line, and G-line refractive indices, respectively.

2. The objective lens of claim 1, wherein the first lens group consists of a positive lens element.

3. The objective lens of claim 1, wherein the negative meniscus lens in the second lens group includes a positive lens element cemented to a negative lens element.

4. The objective lens of claim 1, wherein the third lens group comprises a cemented triplet lens.

5. The objective lens of claim 4, wherein the cemented triplet lens includes, from the object side to the image side, a biconcave lens element, a biconvex lens element, and a positive meniscus lens element having a convex surface oriented toward the image side.

6. The objective lens of claim 1, wherein the third lens group comprises a cemented doublet lens.

7. The objective lens of claim 6, wherein the cemented doublet lens includes, from the object side to the image side, a negative lens element and a positive lens element.

8. The objective lens of claim 1, wherein the second lens group consists of a negative meniscus lens element.

9. The objective lens of claim 1, having a numerical aperture of at least 0.1.

10. The objective lens of claim 1, exhibiting apochromatic optical performance.

11. The objective lens of claim 1, having an overall magnification of 2× or less.

12. An objective lens for a microscope having the properties:

f=100 mm, N.A.=0.1,β=−2.0, W.D.=9.0 mm;. and properties as in the following table

| No. | r (mm) | d (mm) | $n_D$ | $v_D$ | Lens Group |
|---|---|---|---|---|---|
| 1 | 21.504 | 3.2 | 1.67025 | 57.53 | $G_1$ |
| 2 | −225.481 | 14.0 | | | |
| 3 | 18.208 | 3.5 | 1.59951 | 35.51 | $G_2$ |
| 4 | −21.800 | 1.3 | 1.74443 | 49.52 | $G_2$ |
| 5 | 8.236 | 13.0 | | | |
| 6 | −8.870 | 4.3 | 1.67163 | 38.80 | $G_3$ |
| 7 | 46.357 | 2.5 | 1.69911 | 27.83 | $G_3$ |
| 8 | −187.326 | 4.2 | 1.49782 | 82.52 | $G_3$ |
| 9 | −15.356 | 0.1 | | | |
| 10 | −45.031 | 3.2 | 1.49782 | 82.52 | $G_4$ |
| 11 | −22.894 | 0.1 | | | |
| 12 | −248.185 | 1.3 | 1.69680 | 55.60 | $G_4$ |
| 13 | 68.121 | 4.8 | 1.49782 | 82.52 | $G_4$ |
| 14 | −23.164 | | | | | wherein f denotes focal length of the objective lens; N.A. denotes numerical aperture of the objective lens; β denotes magnification of the objective lens; W.D. denotes working distance of the objective lens; the first column labeled "No." sets forth lens surface numbers of respective lens surfaces of the objective lens, beginning on an object side of the objective lens; the second column labeled "r" sets forth a curvature radius of each respective lens surface; the third column labeled "d" sets forth axial distances between respective adjacent pairs of the lens surfaces; the fourth column labeled "$n_D$" sets forth refractive indices, for D-line radiation at $\mu$=587.6 nm, of respective lens elements of the objective lens; the fifth column labeled "$v_D$" sets forth Abbe numbers, for D-line radiation at λ=587.6 nm, of the respective lens elements; and the sixth column lists lens group numbers of the respective lens elements.

13. An objective lens for a microscope having the properties:

f=100 mm; N.A.=0.1 ; β=−2.0; W.D.=9.0 mm; and properties as in the following table

| No. | r (mm) | d (mm) | $n_D$ | $v_D$ | Lens Group |
|---|---|---|---|---|---|
| 1 | 29.597 | 3.2 | 1.72342 | 37.90 | $G_1$ |
| 2 | −55.982 | 15.0 | | | |
| 3 | 58.239 | 2.3 | 1.64006 | 60.04 | $G_2$ |
| 4 | 8.787 | 14.0 | | | |
| 5 | −9.101 | 4.3 | 1.67163 | 38.80 | $G_3$ |
| 6 | 66.431 | 2.5 | 1.69911 | 27.83 | $G_3$ |
| 7 | −101.360 | 4.2 | 1.49782 | 82.52 | $G_3$ |
| 8 | −15.019 | 0.1 | | | |
| 9 | −52.921 | 3.3 | 1.49782 | 82.52 | $G_4$ |
| 10 | −25.292 | 0.1 | | | |
| 11 | −228.517 | 1.2 | 1.69680 | 55.60 | $G_4$ |
| 12 | 72.103 | 4.8 | 1.49782 | 82.52 | $G_4$ |
| 13 | −24.730 | | | | | wherein f denotes focal length of the objective lens; N.A. denotes numerical aperture of the objective lens; β denotes magnification of the objective lens; W.D. denotes working distance of the objective lens; the first column labeled "No." sets forth lens surface numbers of respective lens surfaces of the objective lens, beginning on an object side of the objective lens; the second column labeled "r" sets forth a curvature radius of each respective lens surface; the third column labeled "d" sets forth axial distances between respective adjacent pairs of the lens surfaces; the fourth column labeled "$n_D$" sets forth refractive indices, for D-line radiation at λ=587.6 nm, of respective lens elements of the objective lens; the fifth column labeled "$v_D$" sets forth Abbe numbers, for D-line radiation at λ=587.6 nm, of the respective lens elements; and the sixth column lists lens group numbers of the respective lens elements.

14. An objective lens for a microscope having the properties: f=100 mm; N.A.=0.1; β=−2.0; W.D.=8.88 min; and properties as in the following table

| No. | r (mm) | d (mm) | $n_D$ | $v_D$ | Lens Group |
|---|---|---|---|---|---|
| 1 | 29.548 | 3.2 | 1.72342 | 37.90 | $G_1$ |
| 2 | −47.216 | 14.8 | | | |
| 3 | 71.787 | 2.5 | 1.64006 | 60.04 | $G_2$ |
| 4 | 7.229 | 8.5 | | | |
| 5 | −8.158 | 5.5 | 1.55200 | 49.71 | $G_3$ |
| 6 | ∞ | 4.5 | 1.49782 | 82.52 | $G_3$ |
| 7 | −16.113 | 5.5 | | | |
| 8 | −112.380 | 3.5 | 1.49782 | 82.52 | $G_4$ |
| 9 | −20.254 | 0.1 | | | |
| 10 | −308.980 | 1.3 | 1.71300 | 53.93 | $G_4$ |
| 11 | 41.591 | 5.0 | 1.43385 | 95.25 | $G_4$ |
| 12 | −26.602 | | | | | wherein f denotes focal length of the objective lens; N.A. denotes numerical aperture of the objective lens; β denotes magnification of the objective lens; W.D. denotes working distance of the objective lens; the first column labeled "No." sets forth lens surface numbers of respective lens surfaces of the objective lens, beginning on an object side of the objective lens; the second column labeled "r" sets forth a curvature radius of each respective lens surface; the third column labeled "d" sets forth axial distances between respective adjacent pairs of the lens surfaces; the fourth column labeled "$n_D$" sets forth refractive indices, for D-line radiation at λ=587.6 nm, of respective lens elements of the objective lens; the fifth column labeled "$v_D$" sets forth Abbe numbers, for D-line radiation at λ=587.6 nm, of the respective lens elements; and the sixth column lists lens group numbers of the respective lens elements.

* * * * *

UNITED STATES PATENT AND TRADEMARK OFFICE
CERTIFICATE OF CORRECTION

PATENT NO. : 5,774,272

DATED : June 30, 1998

INVENTOR(S) : KATSUYA WATANABE

It is certified that error appears in the above-identified patent and that said Letters Patent is hereby corrected as shown below:

Column 2, line 9, "$\theta^{4p} - \theta_{4n} < 0.005$" should be -- $\theta_{4p} - \theta_{4n} < 0.005$ --.

Column 3, line 16, "$\theta^{4p} - \theta_{4n} < 0.005$" should be -- $\theta_{4p} - \theta_{4n} < 0.005$ --.

Column 9, line 5, claim 12, delete the period "." after --W.D. = 9.0 mm;--.

Column 9, line 35, claim 12, "$\mu = 587.6$ nm" should be -- $\lambda = 587.6$ nm--.

Column 10, line 20, claim 14, "W.D. =8.88 min;" should be --W.D. = 8.88 mm;--.

Signed and Sealed this

Thirtieth Day of May, 2000

Attest:

Q. TODD DICKINSON

*Attesting Officer*     *Director of Patents and Trademarks*